United States Patent

Pickens et al.

[11] Patent Number: 6,110,434
[45] Date of Patent: Aug. 29, 2000

[54] RECOVERY OF PRODUCTS FROM NON-METALLIC PRODUCTS DERIVED FROM ALUMINUM DROSS

[75] Inventors: John W. Pickens, Strongsville; Michael D. Waite, Brunswick, both of Ohio

[73] Assignee: Alumitech of Cleveland, Inc., Streetsboro, Ohio

[21] Appl. No.: 09/257,071

[22] Filed: Feb. 24, 1999

Related U.S. Application Data

[60] Provisional application No. 60/075,913, Feb. 25, 1998.

[51] Int. Cl.[7] .......................... C22B 21/00; C22B 26/00; C22B 7/00
[52] U.S. Cl. .......................... 423/132; 423/111; 423/127; 423/164
[58] Field of Search .......................... 423/111, 127, 423/132, 164; 75/672

[56] References Cited

U.S. PATENT DOCUMENTS

| | | | |
|---|---|---|---|
| 4,320,098 | 3/1982 | Huckabay et al. | 423/132 |
| 4,348,366 | 9/1982 | Brown et al. | 423/111 |
| 5,102,453 | 4/1992 | Yerushalmi | 75/416 |
| 5,134,102 | 7/1992 | Nadkarni et al. | 501/155 |
| 5,227,143 | 7/1993 | Stewart, Jr. et al. | 423/197 |
| 5,424,260 | 6/1995 | Yerushalmi | 501/155 |
| 5,613,996 | 3/1997 | Lindsay | 423/111 |
| 5,716,426 | 2/1998 | Beelen et al. | 423/600 |

*Primary Examiner*—Steven P. Griffin
*Attorney, Agent, or Firm*—Andrew Alexander

[57] ABSTRACT

A process for recovering one of alumina hydrate, magnesium hydroxide and magnesium aluminate spinel ($MgAl_2O_4$) from aluminum dross wherein the dross is processed to a non-metallic product (NMP). The dross may contain fluxing salts which are removed in providing the NMP. The NMP may be derived from aluminum dross which does not contain fluxing salts sometimes referred to as white dross. The process comprises digesting the non-metallic product with an acid selected from the group consisting of sulfuric, hydrochloric, hydrofluoric and phosphoric acid or mixtures thereof to provide a slurry containing dissolved alumina, magnesia and a solid component, for example, containing magnesium aluminate spinel. Instead of an acid, a base such as sodium hydroxide may be used. The slurry is filtered to separate the solid component from the liquid containing dissolved constituents such as alumina and magnesia to recover the solid component.

29 Claims, 3 Drawing Sheets

FIG.3

RECOVERY OF PRODUCTS FROM NON-METALLIC PRODUCTS DERIVED FROM ALUMINUM DROSS

CROSS REFERENCE TO RELATED APPLICATION

This application claims the benefit of U.S. Provisional Application No. 60/075,913, filed Feb. 25, 1998, incorporated herein by reference.

BACKGROUND OF THE INVENTION

This invention relates to aluminum dross and more particularly, it relates to the recovery of valuable products such as alumina and magnesia from a non-metallic product derived from the aluminum dross.

Aluminum dross results from the melting of aluminum scrap such as used beverage containers, aluminum siding, castings and the like and treating the melt with salt flux. The salt flux accumulates on top of the melt and forms a dross or skim which contains aluminum, oxides of aluminum and elements such as magnesium and silicon and other alloying elements present in the various alloys. Further, the skim contains other non-metallic products or compounds of the aluminum and alloying elements. The dross is removed or skimmed from the melt and processed usually to recover the metallic aluminum occluded in the oxides and non-metallic compounds. The aluminum can constitute 5 to 70% of the dross. Usually, the aluminum, which is considered the most valuable component, is recovered from the solidified dross by first fracturing the dross, for example, by mechanical milling and screening out the aluminum. Thereafter, fractured dross is heated in the presence of additional salt flux to free metallic aluminum. The molten salt flux aids in releasing molten aluminum from the dross. The salt flux is usually comprised of sodium chloride and potassium chloride. After a major portion of metallic aluminum is removed, the dross is comprised of three major components which are aluminum, salt flux and an insoluble constituent comprised largely of aluminum oxide, silicon oxide and magnesium oxide, and other non-metallic compounds. This processed dross is often referred to as salt cake. The three components can be present in the ranges of about 3 to 25 wt. % aluminum, 25 to 50 wt. % salt flux and 25 to 75 wt. % NMP. The NMP (non-metallic product) is comprised mainly of compounds such as oxides of aluminum, silicon and magnesium. Also, included in the salt cake are minor amounts of oxides and other compounds of titanium, copper, iron, calcium, zinc, sulfur, potassium and sodium which constitute part of the NMP. The titanium, copper and zinc compounds, e.g., oxides, can be present from alloying elements in the aluminum scrap. It is desirable to recover all useful constituents from the salt cake. Thus, the salt cake is treated to recover the salts, the insoluble constituents or non-metallic product and any remaining aluminum metal.

The salt cake can be advantageously treated in accordance with the procedures set forth in U.S. Pat. Nos. 5,102,453 and 5,227,143. However, even after such treatment, there remains the insoluble constituent or non-metallic product. U.S. Pat. No. 5,102,453 discloses the problems attendant the presence of magnesium from magnesium-containing alloys and the problems resulting from the addition of magnesium chloride to the recovery system. Namely, such addition increases the overall amount of magnesium chloride contained in the unrecoverable material or non-metallic product and even when disposed of in plastic film-lined landfills, problems still result. Thus, often the process of leaching the salt cake is not optimized to avoid disposal problems with non-metallic product.

U.S. Pat. No. 5,424,260 discloses a process for using non-metallic product from aluminum dross comprising the steps of providing a body of NMP in an aqueous slurry and adjusting the slurry composition by adding alumina or silica in an amount sufficient to form a fired ceramic product on heating.

However, there is still a great need for a process that recovers valuable products from the NMP. The present invention provides such a process.

SUMMARY OF THE INVENTION

It is an object of the present invention to provide an improved process for treating salt cake.

It is another object of the invention to provide an improved process for recovering valuable product from the non-metallic product.

Yet, it is another object of the present invention to treat the non-metallic product to recover alumina values therefrom.

And yet, it is another object of the present invention to provide a process for treating NMP to recover, for example, alumina, magnesia, and magnesium aluminate spinel values as well as ancillary products from trace elements therefrom.

In accordance with these objects, there is provided a process for recovering one of alumina ($Al_2O_3$), magnesia (MgO) and magnesium aluminate spinel ($MgAl_2O_4$) from aluminum dross wherein the dross is processed to a non-metallic product (NMP). The dross may contain fluxing salts which are removed in providing the NMP. The NMP may be derived from aluminum dross which does not contain fluxing salts sometimes referred to as white dross. The process comprises digesting said non-metallic product with an acid selected from the group consisting of sulfuric, hydrochloric, nitric, hydrofluoric and phosphoric acid or mixtures thereof to provide a slurry containing dissolved alumina, magnesia and a solid component, for example, containing magnesium aluminate spinel. Instead of an acid, a base such as sodium hydroxide may be used. The slurry is filtered or other liquid/solid separation process to separate the solid component from the liquid containing dissolved constituents such as alumina and magnesia to recover the solid component.

DETAILED DESCRIPTION OF THE PREFERRED EMBODIMENTS

Secondary aluminum dross of the type contemplated by the invention described herein consists of dross recovered from processes in which aluminum scrap has been melted to prepare reusable metal in the form of aluminum ingots, while tertiary aluminum dross consists of dross recovered from furnaces employed in recovering the secondary dross, both materials being sometimes referred to herein as "dross". Such dross is to be distinguished from dross produced in the process of preparing the original metal by electrolytic means. Although useful in any secondary or tertiary dross leaching-type recovery process such as the one described herein, the invention can be adapted to recovery of aluminum dross containing, for example, large amounts of magnesium chloride derived from the reclamation of used beverage cans. In this regard, beverage cans must have stiffened lids if the pull tabs commonly employed for opening them are to be operable. Such stiffness requires the use of high-magnesium content aluminum alloys for their fabrication; consequently, the invention is particularly applicable to dross obtained from recycled beverage cans which contains large amounts of magnesium chloride for the reasons mentioned. It will be understood, however, that the invention has application to all kinds of dross.

Depending upon its source, and on a weight basis, secondary dross and salt cake will contain 3% to 25% aluminum; 25% to 50% fluxing material, and 25% to 75% NMP. The fluxing material comprises substantially equal weight amounts of sodium chloride and potassium chloride, since a eutectic mixture is formed in that ratio which melts at about 1384° F., compared to 1474° F. for the sodium salt and 1422° F. for the potassium salt. The use of the eutectic allows minimal super-heating of the aluminum, which melts at about 1220° F. to reduce the flux to its operable molten condition.

The process can recover flux salt in substantially the eutectic ratio, a form in which it can be re-used for fluxing purposes, as well as of pure aluminum. Also recovered is a product comprising a high proportion of aluminum metal fines and aluminum oxide, known in the industry as "exotherm", which is useful as an exothermic topping in steel manufacture because of its heat-producing and heat-retention characteristics.

The remaining product of the process is the non-metallic NMP, which in the past has been disposed of in a landfill operation.

Figure 1:
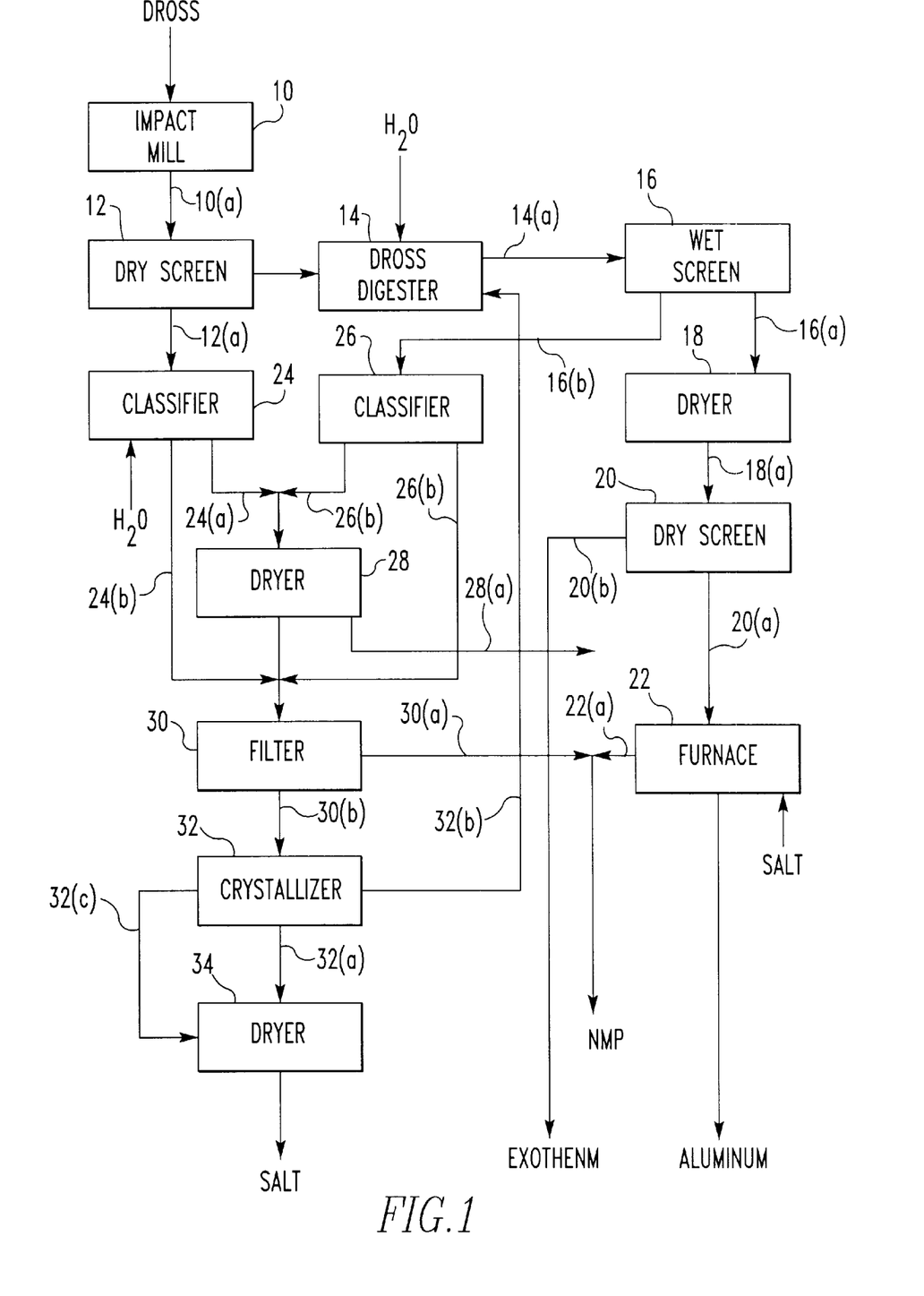
FIG. 1 is a schematic flow diagram of the aluminum dross recovery process showing salt, NMP and aluminum recovery.

Referring now to FIG. 1, the dross is initially processed through a crusher, for example, a ball mill or equivalent device 10, where the received dross is fragmented. The reduced fragments 10(a) are then passed over a screen 12 where size classification of the fragments is carried out. Commonly, at least two fractions are produced, one containing fines, typically below −10 mesh. The other fraction, usually representing up to 80% of the crushed material and known as "middlings", ranges from about −4 to +10 mesh. Pieces larger than four inches can serve as furnace feed without further processing, provided they contain sufficient aluminum content; otherwise, they are recycled to the crusher 10.

Each of the streams, the fines and the middlings, are processed separately in order to maximize recovery of the aluminum content thereof.

The middling stream 12(b) is fed to a dross digester 14 to which water is introduced. The digester can be any suitable vessel capable of holding the dross middlings and the water introduced therein for purposes of leaching the dross solubles. However, it has been advantageous to employ agitated mixers of the type normally carried on concrete trucks since they are readily available and relatively inexpensive, besides possessing the necessary physical characteristics to carry out the leaching operation.

In order to suppress the reactions previously referred to so as to minimize the unwanted production of ammonia, methane, hydrogen, hydrogen sulfide and other noxious products, the leaching operation is carried out in digester 14 at a pH below about 8. In addition, and preferably, the pH is controlled above 5 since below that figure, the digester contents are so acidic that severe corrosion of the equipment is produced.

While the magnesium chloride naturally present in the dross would, in the normal course of the digestion, be sufficient to restrain the pH of the digester contents from rising, some of the magnesium chloride is converted to magnesium hydroxide, which being insoluble, is precipitated from solution. Thus, the contents of the digester become more basic, a condition which favors the creation of still more of the hydroxide, reinforcing the tendency of the digester contents to become so basic that the unwanted reactions referred to are promoted, rather than eliminated.

To avoid the overly-basic condition, it has been found that the introduction into the digester of magnesium chloride containing liquor from the evaporator-crystallizer 32, which shall be described in greater detail in the following, can maintain the pH in the range of from about 5 to about 8 without the addition of extraneous magnesium chloride to the system, the disadvantage of which has already been described. In carrying out the pH adjustment, samples of the digester's contents are periodically subjected to pH analysis and evaporator liquor 32(b) is added, as required, to maintain the pH of the digester in the desired range. Digestion times will vary, depending upon the character of the dross being treated; normally however, the digestion will last from about twenty minutes to one hour.

Following solution of the solubles in the digester 14, its contents 14(a) are fed as a slurry to a wet screening operation with a wet screen 16 which divides the digested materials into one fraction containing coarse particles, for instance, +20 mesh, and a stream of fine particles of about −20 mesh. The coarse particles 16a, which contain a relatively high metallic aluminum content and some aluminum oxide and other non-metallic compounds are sent to a dryer 18, which may be a rotary drum dryer, where the material is dried. The dried material 18(a) is then passed to a dry screen 20 where the material is divided into a coarse fraction of about +8 mesh, and a fines fraction approximately −8 mesh. The coarse fraction 20(a) is passed to a furnace 22, where the material is covered with a layer of flux salt, which acts as an insulating layer, and heated to a temperature sufficient to melt the free aluminum present, the metal then being tapped from the furnace and cast into aluminum ingots. The balance of the material 22(a) constitutes non-metallic product which is removed from the furnace.

Referring again to the wet screening operation at wet screen 16, the fines there obtained are removed as a slurry 16(b), rather than being furnaced, so that any aluminum present in the fines does not combine with oxygen in the furnace to produce aluminum oxide which is less valuable than the aluminum metal.

The slurry 16(b) is sent to a classifier 26 where substantially all remaining aluminum metal is removed from the NMP in the slurry. Solids 26(a) from the classifier are fed to a dryer 28, for example, of the rotary drum type, where they are dried and forwarded as exotherm product 28(a) to storage or sent to a melting furnace for recovery of aluminum metal by melting and casting.

Again referring to dry screen 12, the fines 12(a) therefrom are fed to a classifier 24 or combined with water therein, the classifier in effect functioning as an additional digester. It is unnecessary to control the pH in the classifier 24 since the solids entering the classifier contain minimal aluminum, and therefore, the unwanted side reactions referred to are not a serious problem. The amount of water introduced into classifier 24 is deliberately maintained at a minimum, as is the water added to dross digester 14, in order to reduce the amount of water that is removed in the crystallization operation described in the following. The solids 24(a) discharged from classifier 24 are also fed to dryer 28 and the resulting exotherm product sent to storage.

The liquids or slurries 24(b) and 26(b) leaving the classifier 24 and 26, respectively, are processed in a filter 30 or other liquid/solid separation process system, which may be a rotary drum filter employing diatomaceous earth as a filter aid, or it may be some other type of filter such as a filter press, or an equivalent of the preceding. However, the slurries may be subjected to processing steps such as thickening, classification, chemical treatment and washing, and filtration steps as required. The solid cake obtained from the filter 30(a) or other separation system after being discharged therefrom is collected as NMP. The NMP may be used as-is in some applications or it may be subjected to mixing and/or pyrometallurgical treatments for other applications. Suppression of the unwanted reactions referred to in connection with the dross digester 14 has a further beneficial affect in that it permits filter 30 to operate at lower temperatures, and thus more satisfactorily than would otherwise be the case. The liquid 30(b) from the filter may be introduced into a crystallizer 32 (when used) where the water is evaporated and the flux salts crystallized.

A portion of the liquor in the crystallizer 32 may be transferred as a side stream 32b, normally containing about 8 wt. % to 9 wt. % of magnesium chloride back to the dross digester 14 to act as a pH control, as previously described. The crystallizer may be any one of the many types available in the market.

The crystallizer normally operates at a temperature of about 235° F. to 236° F., a temperature at which the flux salt gradually precipitates from solution. Were it not removed, however, the continual addition of the magnesium chloride contained in the brine fed to the crystallizer would raise the boiling point of the liquor and result in the temperature of the crystallizer rising, for example to about 243° F., a point at which the magnesium chloride would then also precipitate from solution. Such a temperature, however, would result in problems being experienced with the crystallization operation, among other things, due to the fact that the high temperature would cause shutdown of the compressor used in conjunction with the crystallization system. This difficulty is overcome, however, not only by removal of the magnesium chloride stream 32(b) recycled to the dross digester 14, but also by a further side stream 32(c) removed from the crystallizer. Preferably in this regard, the magnesium chloride present in the crystallizer is controlled by withdrawal of such streams in amounts such that the magnesium chloride present in the crystallizer does not exceed about 3 wt. % to 7 wt. %, a concentration at which the temperature of the crystallizer can be maintained at about 235° F. to 236° F. The fluxing salts 32(a) recovered from the crystallizer 32 are sent to a dryer 34 wherein the salts are dried and forwarded to storage. The stream 32(c) from the crystallizer also discharges into the dryer, the magnesium chloride thereby being removed from the system, or it can otherwise be disposed of.

The amount of NMP produced from dross or skim can range from 25 wt. % to 75 wt. % of the total dross processed, depending to some extent on the nature of the dross being processed. Thus, while other processes were selected carefully to minimize the amount of NMP, any process may be used to treat the dross because all the end products resulting from the process can be used. Further, the present invention permits the use of any aluminum dross.

For purposes of the present invention, it is preferred that the NMP comprises about 40 wt. % to 75 wt. % $Al_2O_3$, 0 wt. % to 20 wt. % MgO, and 0 to 15 wt. % $SiO_2$, the remainder may be comprised of oxides and compounds of Ti, Cu, Zn, K, S, Ca and Na and other trace elements. It will be appreciated that other aluminum, magnesium and/or silicon compounds can be present. The NMP of the present invention can comprise less than 1 wt. % and preferably 0.5 wt. % each of aluminum metal and aluminum nitride. Preferably, the NMP comprises about 50 wt. % to 75 wt. % $Al_2O_3$, 1 wt. % to 18 wt. % MgO, and 3 to 12 wt. % $SiO_2$ with a typical amount being about 54 wt. % $Al_2O_3$, 11 wt. % MgO, 4 wt. % or more $SiO_2$, 5.6 wt. % CaO, 3 wt. % $TiO_2$, and about 2 wt. % $Fe_2O_3$. In addition, the NMP can contain up to 0.3 wt. % S, up to 5 wt. % C, up to 2 wt. % or more Cl and have an LOI (weight loss on ignition due mainly to removal of chemically hydrated water and carbon compounds) of about 20 wt. %. The LOI can range from 5 to 35 wt. % at 1400° C. The use of $Al_2O_3$ herein is meant to include all the aluminum oxide compounds or forms present in the NMP. Similarly, the use of MgO or $SiO_2$ is meant to include other oxide forms. Also, LOI referred to herein is meant on a dry basis. That is, the NMP is substantially free of free water and the LOI reflects chemically bound water and other thermally activated volatile species such as carbon compounds. While not wishing to be bound by any theory of invention, it is believed that the LOI is important in promoting mass transfer during calcination and oxidation reactions.

The NMP recovered from the dross treatment is usually in the form of filter cake and can contain up to about 50 wt. % $H_2O$. If dried the NMP would have a particle size that would pass through a 20 mesh, Standard Sieve. Thus, normally, the NMP can be used in the condition as removed from the dross treatment.

Chemical analysis for NMP from secondary salt drosses processed in accordance with the system are provided in Table 1. Also provided are mineralogical phase information on the character of the NMP after front end processing is complete. The NMP produced in accordance with the invention is substantially free of aluminum metal and aluminum nitride. That is, the aluminum metal and nitrogen contents of NMP dross residue produced in accordance with the invention are extremely low. By substantially free is meant that nitrogen can range from 0.1 to 0.5 wt. % and typically no more than about 1 wt. % aluminum metal and nitrogen. However, for the present invention, aluminum can be present up to 4 or 5 wt. %, if desired. Nitrogen is on the order of only ~0.2 wt. %. A further feature of the process is the presence of a major amount of amorphous material in the NMP. It is believed that this may be an amorphous alumina precursor phase. The amorphous aluminum bearing phase, which once calcined, can become alpha alumina (corundum). Wet digestion performed in the process is believed to produce a hydrated amorphous phase. Measured chemically bound hydrated water in some samples has accounted for about 10% of the NMP sample weight.

Wet digestion of the NMP can be conducted before or after calcining. However, the degree of digestion for a given set of digestion process conditions generally occurs at a high rate and to a greater degree of completion if digestion proceeds calcining.

TABLE 1

380 Alloy Type Dross
Composition of NMP Dross Residues

| | ELEMENTAL BASIS | | | | | | | OXIDE BASIS | | | | | |
|---|---|---|---|---|---|---|---|---|---|---|---|---|---|
| | After Calcine | | | Before Calcine | | | | After Calcine | | | Before Calcine | | |
| | I | II | III | I | II | III | | I | II | III | I | II | III |
| Na | 0.26 | 0.23 | 0.21 | 0.21 | 0.19 | 0.18 | $Na_2O$ | 0.35 | 0.3 | 0.28 | 0.29 | 0.25 | 0.24 |
| Mg | 9.13 | 9.29 | 8.69 | 7.53 | 7.65 | 7.31 | MgO | 15.14 | 15.4 | 14.4 | 12.48 | 12.68 | 12.11 |
| Si | 4.41 | 3.66 | 4.99 | 3.64 | 3.01 | 4.20 | $SiO_2$ | 9.43 | 7.82 | 10.67 | 7.78 | 6.44 | 8.97 |
| K | 0.18 | 0.12 | 0.22 | 0.15 | 0.10 | 0.19 | $K_2O$ | 0.22 | 0.15 | 0.26 | 0.18 | 0.12 | 0.22 |
| Ca | 0.90 | 1.92 | 1.64 | 0.74 | 1.58 | 1.38 | CaO | 1.26 | 2.68 | 2.3 | 1.04 | 2.21 | 1.93 |
| Ti | 0.52 | 0.89 | 1.05 | 0.43 | 0.73 | 0.88 | $TiO_2$ | 0.87 | 1.48 | 1.75 | 0.72 | 1.22 | 1.47 |
| Cr | 0.08 | 0.09 | 0.08 | 0.07 | 0.07 | 0.07 | $Cr_2O_3$ | 0.11 | 0.13 | 0.12 | 0.09 | 0.1 | 0.10 |
| Mn | 0.18 | 0.18 | 0.19 | 0.15 | 0.15 | 0.16 | MnO | 0.23 | 0.23 | 0.25 | 0.19 | 0.19 | 0.21 |
| Fe | 1.73 | 1.48 | 1.49 | 1.43 | 1.22 | 1.25 | $Fe_2O_3$ | 2.48 | 2.11 | 2.14 | 2.04 | 1.74 | 1.80 |
| Zr | 0.02 | 0.01 | 0.01 | 0.02 | 0.01 | 0.01 | $ZrO_2$ | 0.03 | 0.02 | 0.01 | 0.02 | 0.02 | 0.01 |
| Al | 36.27 | 36.64 | 35.80 | 29.90 | 30.16 | 30.1 | $Al_2O_3$ | 68.53 | 69.23 | 67.65 | 56.50 | 56.99 | 56.90 |
| P | 0.09 | 0.06 | 0.06 | 0.07 | 0.05 | 0.04 | $P_2O_5$ | 0.2 | 0.14 | 0.12 | 0.16 | 0.12 | 0.10 |
| Ni | 0.05 | 0.02 | 0.02 | 0.04 | 0.02 | 0.02 | NiO | 0.06 | 0.03 | 0.03 | 0.05 | 0.02 | 0.03 |
| Cu | 0.67 | 0.52 | 0.59 | 0.55 | 0.43 | 0.50 | CuO | 0.84 | 0.65 | 0.74 | 0.69 | 0.54 | 0.62 |
| S | | | | 0.18 | 0.15 | 0.18 | | | | | | | |
| C | | 0.006 to 0.012 | | 2.23 | 1.92 | 2.02 | | | | | | | |
| % LOI | 0.00 | 0.00 | 0.00 | 17.55 | 17.68 | 15.89 | | 0.00 | 0.00 | 0.00 | 17.55 | 17.68 | 15.89 |

Aluminum & nitrogen analysis:
As-Processed Before Calcining:

Aluminum Metal Content = 0.35 to 1.14 wt. %
Nitrogen Content = 0.17 to 0.22 wt. %
Chemically Bound, Hydrate Radicals = 8.6 to 10.4 wt. %
After Calcining:

Aluminum Metal Content = <0.01 to 0.05 wt. %
Nitrogen Content = 0.0050 to 0.0115 wt. %

Mineralogical Phase analysis:
As-Processed Before Calcining:

$MgAl_2O_4$ Spinel-#1 major
$Al_2O_3$ Corundum-#2/3 moderate/major
$SiO_2$ Quartz-#2/3 moderate/major
$CaF_2$ Fluorite-low $CaCO_3$-low
$CaMg(CO_3)_2$-low
$KAlSi_3O_8$-low/moderate
Amorphous phase present The composition of NMP in dross also varies as a function of the type of aluminum alloy from which it is derived. Elements present in the metal alloy are reflected in the NMP chemical composition. Tables 1 and 2 are examples and each reflect a type of dross which is derived from a respective family of metal alloys and are illustrative of the components derived from certain drosses. Therefore, chemical digestion results in varying concentrations of chemical species in solution. The process path followed can be modified to provide the best advantage considering the raw material feedstock processed and the product application available.

Tables 1 and 2 provide compositions of NMP which result from processing secondary salt drosses and saltcake. It is denoted as "Before Calcine". As such, it contains bound water and has an LOI (loss on ignition) on the order of 15–18% for 380 type NMP (Table 1) and 20–22% for the de-ox type (Table 2). The LOI can range from 5 to 25 wt. % at 1400° C. The composition of the NMP after complete calcining to 0% remnant LOI is denoted "After Calcine".

TABLE 2

DE-OX Alloy Type NMP
Composition of NMP Dross Residues

| | ELEMENTAL BASIS | | | | | OXIDE BASIS | | | |
|---|---|---|---|---|---|---|---|---|---|
| | After Calcine | | Before Calcine | | | After Calcine | | Before Calcine | |
| | I | II | I | II | | I | II | I | II |
| Na | 0.15 | 0.24 | 0.12 | 0.19 | $Na_2O$ | 0.19 | 0.33 | 0.15 | 0.26 |
| Mg | 8.06 | 7.49 | 6.48 | 5.83 | MgO | 13.36 | 12.41 | 10.74 | 9.65 |
| Si | 2.33 | 3.24 | 1.87 | 2.52 | $SiO_2$ | 4.98 | 6.92 | 4.00 | 5.38 |
| K | 0.04 | 0.13 | 0.03 | 0.10 | $K_2O$ | 0.05 | 0.16 | 0.04 | 0.12 |
| Ca | 3.29 | 33.32 | 2.64 | 25.92 | CaO | 4.60 | 4.65 | 3.70 | 3.62 |
| Ti | 0.86 | 1.3 | 0.69 | 1.01 | $TiO_2$ | 1.44 | 2.17 | 1.16 | 1.69 |
| Cr | 0.08 | 0.08 | 0.06 | 0.06 | $Cr_2O_3$ | 0.12 | 0.12 | 0.10 | 0.09 |
| Mn | 0.12 | 0.15 | 0.10 | 0.12 | MnO | 0.16 | 0.19 | 0.13 | 0.15 |
| Fe | 1.89 | 2.28 | 1.52 | 1.77 | $Fe_2O_3$ | 2.70 | 3.26 | 2.17 | 2.54 |
| Zr | 0.01 | 0.01 | 0.01 | 0.01 | $ZrO_2$ | 0.01 | 0.01 | 0.01 | 0.01 |
| Al | 38.28 | 36.94 | 30.77 | 28.73 | $Al_2O_3$ | 72.33 | 69.81 | 58.15 | 54.30 |
| P | 0.07 | 0.07 | 0.06 | 0.05 | $P_2O_5$ | 0.16 | 0.16 | 0.13 | 0.12 |
| Ni | | | 0.00 | 0.00 | NiO | 0.04 | 0.04 | 0.03 | 0.03 |
| Cu | | | 0.00 | 0.00 | CuO | 0.41 | 0.45 | 0.33 | 0.35 |

TABLE 2-continued

DE-OX Alloy Type NMP
Composition of NMP Dross Residues

| | ELEMENTAL BASIS | | | | OXIDE BASIS | | | |
|---|---|---|---|---|---|---|---|---|
| | After Calcine | | Before Calcine | | After Calcine | | Before Calcine | |
| | I | II | I | II | I | II | I | II |
| S | <0.01 | <0.01 | 0.24 | 0.24 | | | | |
| C | NYA | NYA | 4.75 | 4.48 | | | | |
| % LOI | 0.00 | 0.00 | 19.61 | 22.22 | 0.00 | 0.00 | 19.61 | 22.22 |

| Aluminum & nitrogen analysis As-Processed Before Calcining: | Mineralogical Phase analysis: As-Processed Before Calcining: |
|---|---|
| Aluminum Metal Content = 0.24 wt. % Nitrogen Content = 0.2 wt. % | $MgAl_2O_4$ Spinel-#1 major $Al_2O_3$ Corundum-#2 major $CaCO_3$ Calcite-#3 moderate $CaF_2$ Fluorite-#4 moderate $MgF_2$ Sellaite-#5 moderate $SiO_2$ Quartz-#6 low Several faint unidentified peaks Amorphous phase presence |

In the process of recovering valuable compounds such as alumina and magnesia from NMP, the NMP is digested for purposes of dissolution. The NMP can either be digested in an acid or in a basic solution such as a caustic solution (see FIG. 2). Further, using either an acid or base solution, the NMP may be heated to a temperature sufficiently high and for a period of time sufficiently long to dissolve some or all of the NMP. Or, the NMP can first be treated in a basic solution and then in an acidic solution to dissolve some or all of the NMP. Dissolving the NMP is important because the components comprising the NMP can each be precipitated separately in a more purified form, thereby enhancing the commercial value of the product. The separate components, e.g., alumina or magnesia or magnesium compounds such as magnesium aluminate spinel, have much greater value individually than when they are co-mingled in the NMP. The process may be adjusted to yield more spinel and less alumina and magnesia. Or, the process may be adjusted to provide more alumina and magnesia and less spinel.

If a basic solution such as a caustic solution is used, the solution will preferentially dissolve alumina. $Al(OH)_3$ of high purity can be precipitated from the caustic solution by lowering the pH of the caustic solution. The $Al(OH)_3$ obtained from the solution can have a purity as high as 99.7% (see FIG. 2).

In a preferred aspect of the invention, the NMP is treated in an acid digester. The digester can be used to selectively dissolve certain components of the NMP, for example, alumina and magnesia can be dissolved while a solid component comprised of magnesium aluminate spinel can remain undissolved. Typically, digestion is permitted to occur until 50–65 wt. % of the NMP becomes dissolved in the acid solution. It will be appreciated that the amount of dissolution depends to some extent on the amount of alumina and magnesia in the NMP, as well as time, temperature, agitation, pressure and acidity. For example, if the alumina and magnesia comprised 75 wt. % and 20 wt. % of the NMP, then higher levels of alumina and magnesia can be dissolved in the acid digester. Further, it will be appreciated that other constituents such as silica, calcium oxide, titania and iron oxide present in the NMP can also be dissolved in the acid digester, and therefore selection and control of the pH path is required to avoid contamination of the main material recovered.

For purposes of the acid digester, any acid can be used which is effective in dissolving or selectively dissolving the NMP. Preferred acids used for digesting include sulfuric, hydrochloric, hydrofluoric, nitric and phosphoric acid or mixtures thereof based on reactivity, cost, recovery and safety with sulfuric acid being the preferred acid within this group (see FIG. 2).

In digesting NMP with sulfuric acid, for example, approximately one pound of $H_2SO_4$ (concentration 93–98 wt. %) is added to about one pound of NMP, on a dry basis, depending to some extent on the composition of the NMP. The ratio of acid to NMP by weight can range from about 0.5–2 sulfuric acid. However, depending on the acid used, the process can be adjusted to accommodate the different compositions of NMP. Water is added to the digester to enhance reactivity of the acid with the NMP.

In preferred operations, the digester is maintained at an elevated temperature, for example, up to 300° C. and preferably at a temperature in the range of 35° to 250° C., typically 60° to 135° C. to provide a digested slurry. Time at temperature depends to some extent on the temperature, but preferred times are typically 15–180 minutes with longer times not found to be detrimental. Shorter times can be used at higher temperatures. The digestion may be carried out at elevated temperatures and pressures, if desired.

The resulting slurry is filtered. That is, the slurry is comprised of a liquid component and a solid component. The solid component is comprised of magnesium aluminate spinel and other minor insoluble material to be separated.

The liquid component is comprised of sulfuric acid and dissolved constituents such as alumina and magnesia as well as other minor soluble material, particularly when sulfuric acid is used. The slurry is filtered to separate the solid component from the filtered liquid component. The solid component or undigested NMP is rinsed and dried to recover the magnesium aluminate spinel separate from the alumina and magnesia contained in the NMP.

Figure 2:
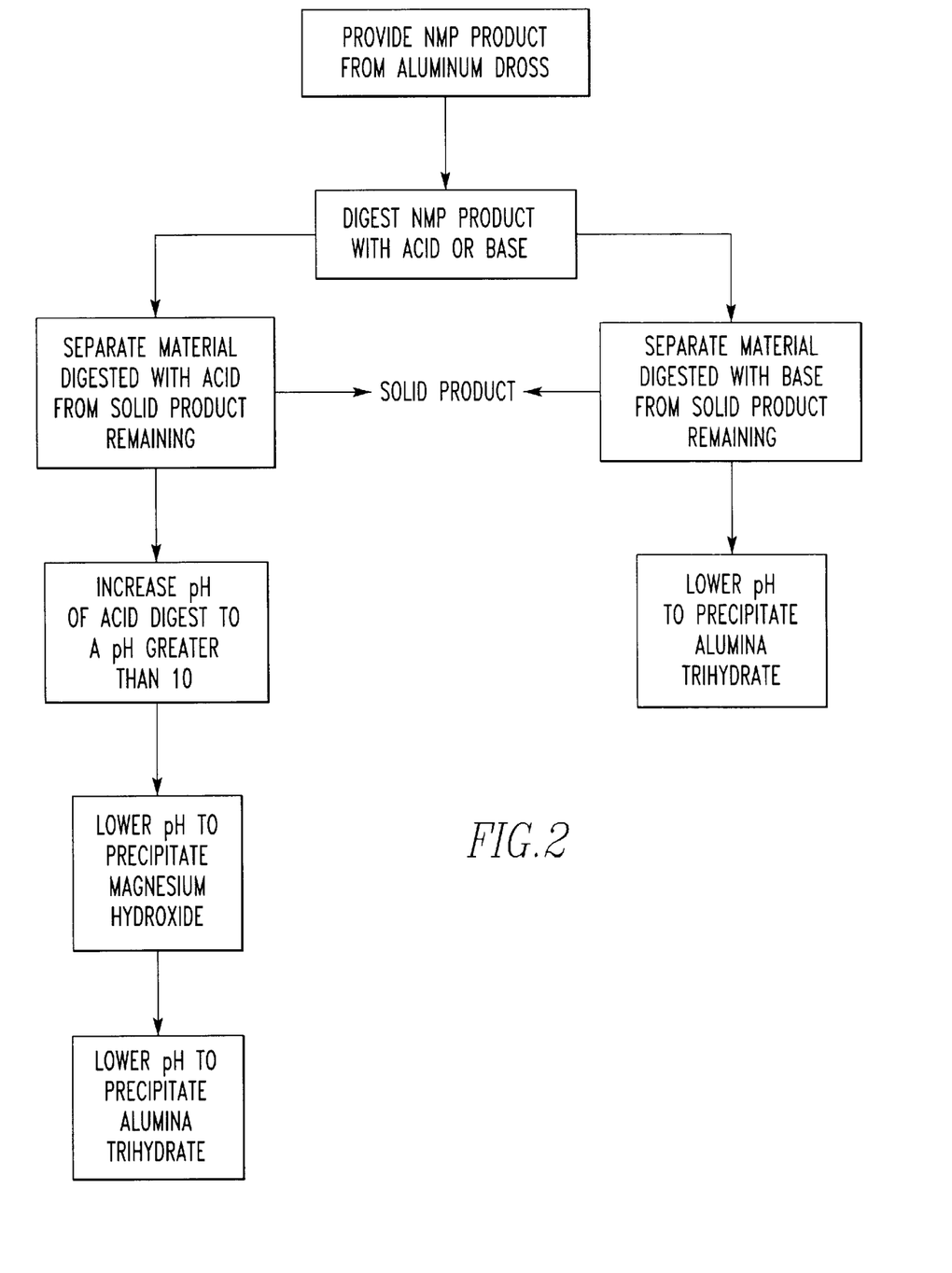
FIG. 2 is a schematic flow chart showing steps in processing the NMP to recover useful products therefrom.

To recover the major dissolved constituents in the liquid, the pH of the liquid can be raised along a pH path selected, depending on the composition of the liquid. If the pH is raised to about 7, it will be found that mixed oxides will precipitate, for example, oxides of Al, Mg, Si, Fe, Ti and others, if present, will be precipitated. If desired, these can be removed from the solution. If the pH of the filtered liquid component is raised to greater than about 9.5, e.g., 9.5 to 12, the magnesium oxide in the liquid is precipitated and can be removed by filtering. Then, the combined alumina and mixed oxides removed at pH 7 can be slurried. At a pH of about 10 to 11, the alumina is held in solution and the mixed oxides remain as a solid. The mixed oxides can then be removed by filtration. When the pH of the remaining liquid is lowered to about 7, alumina trihydrate will precipitate and a substantially pure product can be recovered. The pH of the liquid can be raised by adding an alkali or alkaline metal hydroxide such as sodium hydroxide. These steps are shown in FIG. 2.

Alumina trihydrate as used herein is meant to include $Al_2O_3 \cdot 3H_2O$ or $Al(OH)_3$ and may be referred to as aluminum hydroxide, aluminum hydrate, hydrated alumina, alumina hydrate or hydrated aluminum oxide. The alumina trihydrate may be heated or calcined to drive off the water and recover alumina.

In an alternative method, if the pH of the liquid is raised to a pH in the range of 11 to 12, a crystalline form of alumina trihydrate will precipitate at about a pH of 11.8. In certain instances, it may be desirable to seed the liquid to bring about precipitation. This provides separation of the alumina from other constituents. The alumina trihydrate may be rinsed and calcined to provide high purity alumina.

In yet another method, the alumina and mixed oxides may be precipitated at pH 7. The pH can be raised further to redissolve alumina, e.g., pH of 10 or greater, at which point the mixed oxide precipitate may be filtered from solution. Thereafter, the pH can be lowered to a pH of about 8 to 9 to precipitate magnesium hydroxide which may be filtered from solution. Further lowering the pH to about 7 will precipitate alumina trihydrate which can be recovered. Thus, this process recovers the three major constituents from NMP.

Further, because the process consumes significant amounts of acid and bases, the spent acid and base material can be regenerated, for example, by selective membrane technology. The chemicals are then available for re-use in the process.

It will be appreciated that different precipitation paths or pH paths can be used in the invention, depending to some extent on the composition, character of the NMP, the resulting solution composition from digestion and the end products desired. For example, it may be desirable to recover the spinel and mixed oxide from alumina and magnesia. Or, it may be desirable to recover a precipitate of alumina and magnesia.

The steps chosen depend on the composition of the NMP because that determines the chemical species that will be put into solution. Having put them into solution, the process path used to harvest the species from solution would depend on what is in solution and the conditions such as pH under which they will precipitate, and what the end use for the products is. For example, if the products will be sold as raw material to be melted to produce a fused spinel product such as for an abrasive application, then mixed oxide impurities are recovered. All of the alumina, magnesia, and spinel recovered would remain together and forwarded to a melter.

In other applications where separate alumina, magnesia, and spinel abrasive products are made, three components are segregated with the process of the invention. In that case, a different process path would be required. Some applications in abrasives require greater or lesser purity than others.

It will be appreciated that magnetic separation may be used in conjunction with this process to remove iron constituents.

Figure 3:
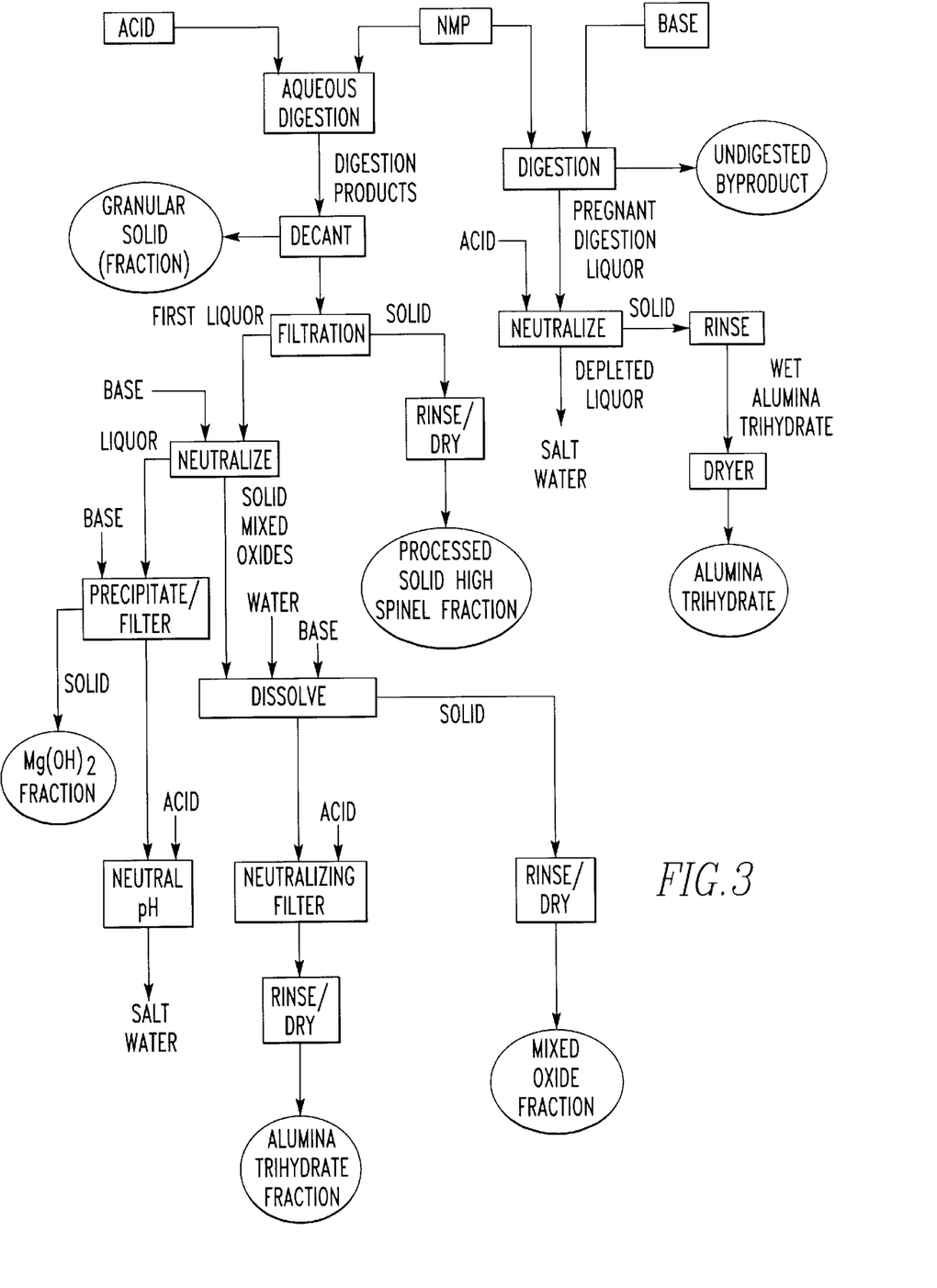
FIG. 3 is another flow chart showing steps in processing the NMP to recover useful products therefrom.

Another embodiment of the invention is illustrated in FIG. 3 where NMP is digested either in acid or base. If a basic solution is used, then the digest is first filtered to remove an undigested by-product. The pregnant liquor is then neutralized with acid to provide a precipitate of alumina trihydrate which is removed, rinsed and dried to provide alumina trihydrate product. Depleted liquor is removed as salt water. If an acid is used, granular solids having a high silicon fraction are first removed. The remaining digest products are then subject to filtration to remove undigested solids which are rinsed and dried to produce a processed solid component having a high spinel fraction. The liquor separated from the solids is neutralized by addition of a base material to produce or precipitate mixed oxides comprised of alumina and oxides such as Si, Fe, Ti and other minor oxides but not including magnesium. The mixed oxide precipitate is filtered and removed from a second liquor. The second liquor is treated with a base material, e.g., NaOH, to raise the pH to 8 to 9 or above to precipitate magnesium hydroxide which is filtered and removed as a magnesium hydroxide solid fraction. The remaining liquid can be neutralized with acid and removed as salt water. The mixed oxide precipitate is treated with base material to dissolve the alumina and thus water and sodium hydroxide may be added. A residual amount of the mixed oxides do not dissolve in the basic solution and thus these materials are removed as a solid which is rinsed and dried to provide a mixed oxide fraction (see FIG. 3). After removing the mixed oxide fraction, the remaining solution is neutralized or the pH is lowered to precipitate alumina trihydrate which is rinsed, dried and recovered as an alumina trihydrate fraction.

The following examples are further illustrative of the invention.

EXAMPLE 1

In this example, NMP was treated with a caustic solution to recover alumina from the NMP. To 50 grams of NMP (dry weight 31.7 grams) (composition comprised of approximately 56 wt. % alumina, 2.5 wt. % magnesia) was added 50.1 grams NaOH pellets and 125 grams distilled water in a digestion vessel. The digest was heated to boiling and then permitted to simmer at about 210° F. for 8 hours under constant agitation. Thereafter, the digest was permitted to cool and the undigested solids were separated from the liquid. The undigested solids were rinsed and dried at 200° F. overnight. Alumina trihydrate was precipitated from the liquid by adjusting the pH to about 7 by the addition of sulfuric acid. The precipitate and liquid were heated to boiling to promote flocculation of the alumina trihydrate and separation. The alumina trihydrate was rinsed in distilled water and refiltered and dried overnight at 200° F. About 20 wt. % of the NMP was dissolved by digestion with the caustic solution and a high purity alumina product (about 99.75% alumina) was obtained. Also, the remaining undigested NMP constituted a high spinel powder content which still contained some alumina.

EXAMPLE 2

This example was substantially the same as Example 1 except 50 grams of calcined NMP was digested in a caustic solution. The digestion was for a period of two hours and the amount of sodium hydroxide pellets was 15 grams. It was observed that the calcined NMP produced less alumina product compared to uncalcined NMP as in Example 1.

EXAMPLE 3

In this example, the undigested solids from Example 1 were subjected to an acid digest. For this example, 10 grams of $H_2SO_4$ (95.7 wt. % $H_2SO_4$) was added to 200 grams distilled water and 6.21 grams of undigested NMP from Example 1 was added. The resulting slurry was then simmered with agitation for 8 hours. Thereafter, the slurry was filtered to remove remaining solids and the liquid was brought to a neutral pH to precipitate dissolved solids. About 3.1 grams of solids remained after digesting with acid and about 3.1 grams of a mixed oxide precipitate was recovered from the neutralized solution. Thus, about half the undigested solids from Example 1 were dissolved in the acid digest.

EXAMPLE 4

In this example, NMP having the composition of Example 1 was subjected to an acid digest followed by controlled or selective precipitation of the dissolved components along a pH path in order to recover substantially pure alumina and magnesia. In this example, 50.06 grams NMP (dry wt. 31.7 grams) and 50.3 grams $H_2SO_4$ (95.7 wt. %) were added together with water to make a 500 ml slurry.

The slurry was heated to boiling and then permitted to simmer with agitation for two hours. The slurry or digest was permitted to cool and a solid component was separated from the liquid component. The solid component comprised of undigested NMP was rinsed and dried. The undigested NMP was comprised mainly of magnesium aluminate spinel.

To the liquid component was added sodium hydroxide pellets until a neutral pH was reached and precipitation of dissolved solids occurred. After precipitation, the solution and solids were heated to boiling to assure equilibrium. To the neutralized solution containing precipitate was added sodium hydroxide pellets to raise the pH to 11 to provide a basic solution containing redissolved alumina. The basic solution was then heated to boiling to assure equilibrium and facilitate filtration. This solution was cooled and the mixed oxide precipitate filtered therefrom to provide a filtered solution.

To the filtered solution was added hydrochloric acid to obtain a neutral pH and to precipitate alumina trihydrate and magnesium hydroxide from the solution. The neutralized solution and alumina trihydrate and magnesium hydroxide precipitates were boiled and after cooling the precipitates filtered therefrom and rinsed. The combined alumina trihydrate and magnesium hydroxide precipitates were dried and recovered.

The mixed oxide precipitate was re-slurried by adding 800 ml water thereto and heating under agitation. The mixed oxides were dissolved by lowering the pH to 1 using sulfuric acid. Precipitation was initiated from this solution by adding sodium hydroxide and heating with agitation. This step was repeated several times until the solution had a pH of about 8. After cooling, the precipitate which was comprised of mixed oxides was separated from solution and rinsed and dried. To the remaining solution or filtrate was added sodium hydroxide to provide a neutral pH. This forced precipitation of separate unidentified metal oxides having a blue color.

Thus, it can be seen that NMP can be treated in an acid or basic digest to recover valuable products such as alumina, magnesia and magnesium aluminate spinel or other phases from the NMP.

What is claimed is:

1. A process for recovering magnesium aluminate spinel ($MgAl_2O_4$) from a non-metallic product (NMP) which has been obtained from aluminum dross, the non-metallic product containing alumina, magnesia, and magnesium aluminate spinel, the process comprising:
   (a) digesting said non-metallic product with an acid selected from the group consisting of sulfuric, hydrochloric, hydrofluoric, nitric and phosphoric acid or mixtures thereof to dissolve alumina and magnesia without dissolving a solid component containing magnesium aluminate spinel;
   (b) filtering said solid component comprised of magnesium aluminate spinel from liquid containing dissolved alumina and magnesia; and
   (c) recovering said solid component comprised of magnesium aluminate spinel.

2. The method in accordance with claim 1 including the step of raising the pH of said liquid to a pH in the range of 5 to 7.5 to precipitate oxides and alumina hydrate therefrom.

3. The method in accordance with claim 1 including the step of raising the pH of said liquid to a pH sufficiently high to provide a basic solution containing dissolved alumina and precipitated magnesium hydroxide.

4. The method in accordance with claim 2 including the steps of removing the oxides and alumina hydrate from said liquid and raising the pH of said liquid to pH sufficient to precipitate magnesium hydroxide to recover magnesium hydroxide therefrom.

5. The method in accordance with claim 2 including the step of dissolving said alumina hydrate from said oxides in a solution having a pH of 9 or greater.

6. The method in accordance with claim 5 including the step of separating said oxides from said dissolved alumina trihydrate to provide a solution depleted in oxides.

7. The method in accordance with claim 6 including the step of lowering the pH of said solution depleted in oxides to precipitate alumina hydrate and recover alumina hydrate therefrom.

8. The method in accordance with claim 5 including the step of raising the pH of said solution to a pH in the range of 10 to 12 to provide a basic solution containing dissolved alumina.

9. The method in accordance with claim 4 including raising the pH of said liquid to a pH in the range of 7.5 to 9.5 to precipitate magnesium hydroxide.

10. The method in accordance with claim 1 including contacting said non-metallic product with a caustic solution prior to digesting in said acid.

11. The method in accordance with claim 3 including dissolving an alkali or alkaline earth metal hydroxide in said liquid to raise the pH.

12. The method in accordance with claim 3 including dissolving sodium hydroxide in said liquid to raise the pH.

13. The method in accordance with claim 3 including separating said precipitated magnesium hydroxide from said dissolved alumina.

14. A process for recovering one of alumina hydrate, magnesium hydroxide ($Mg(OH)_2$), and magnesium aluminate spinel ($MgAl_2O_4$) from a non-metallic product (NMP) which has been obtained from aluminum dross, the process comprising:
   (a) digesting said non-metallic product with an acid to provide a slurry containing dissolved alumina, magnesia and a solid component comprised of magnesium aluminate spinel;
   (b) filtering said slurry to separate said solid component from acidic liquid containing dissolved alumina and magnesia to recover said solid component;
   (c) raising the pH of said acidic liquid containing dissolved alumina to provide a liquid having a pH in the range of 6 to 7.5 to precipitate alumina hydrate and mixed oxides;
   (d) removing said precipitated alumina hydrate and mixed oxides from said solution at pH in the range of 6 to 7.5 to provide an alumina-hydrate depleted solution;
   (e) raising the pH of said alumina-hydrate depleted solution to a pH sufficient to precipitate magnesium hydroxide;
   (f) separating the precipitated magnesium hydroxide from said solution to recover magnesium hydroxide.

15. The method in accordance with claim 14 including the step of dissolving said alumina hydrate from said mixed oxides in a solution having a pH of 9 or greater.

16. The method in accordance with claim 14 including raising the alumina-hydrate depleted solution to a pH in the range of 7.5 to 9.5 to precipitate magnesium hydroxide.

17. The method in accordance with claim 14 including the step of dissolving said alumina hydrate from said mixed oxides in a solution having a pH in the range of 9.5 to 12.

18. The method in accordance with claim 14 wherein said acid is an acid selected from the group consisting of sulfuric, hydrochloric, hydrofluoric, nitric and phosphoric acid and mixtures thereof.

19. The method in accordance with claim 14 including the step of separating said mixed oxides from said dissolved alumina trihydrate to provide a solution depleted in mixed oxides.

20. The method in accordance with claim 19 including the step of lowering the pH of said solution depleted in mixed oxides to precipitate alumina hydrate therefrom.

21. A process for recovering one of alumina hydrate, magnesium hydroxide ($Mg(OH)_2$), and magnesium aluminate spinel ($MgAl_2O_4$) from a non-metallic product (NMP) which has been obtained from aluminum dross, the process comprising:
  (a) crushing the salt-containing aluminum dross;
  (b) contacting the crushed dross with water to dissolve water-soluble compounds contained therein to provide an aqueous solution containing both soluble and insoluble material;
  (c) separating the insoluble material from the aqueous solution containing soluble material;
  (d) recovering a body of non-metallic product from the insoluble material, the non-metallic product comprised of alumina, magnesia and magnesium aluminate spinel;
  (e) digesting said non-metallic product with an acid to provide a slurry containing dissolved alumina and magnesia and a solid component;
  (f) filtering said slurry to separate said solid component from said slurry to provide a liquid containing dissolved alumina and dissolved magnesia;
  (g) raising the pH of said liquid containing dissolved alumina and dissolved magnesia to provide a solution containing precipitated alumina hydrate and mixed oxides;
  (h) separating the precipitated alumina hydrate and mixed oxides from said solution to provide an alumina-depleted solution;
  (i) raising the pH of said alumina-depleted solution to a pH which precipitates magnesium hydroxide; and
  (j) separating the precipitated magnesium hydroxide from the alumina-depleted solution to recover said magnesium hydroxide.

22. The method in accordance with claim 21 including dissolving said alumina hydrate from said mixed oxides in a solution having a pH in the range of 9 to 12.

23. The method in accordance with claim 21 including separating said mixed oxides from said dissolved alumina hydrate to provide a mixed oxide-depleted solution.

24. The method in accordance with claim 23 including lowering the pH of the mixed oxide-depleted solution to a pH in the range of 6 to 7.5 to precipitate said alumina hydrate.

25. The method in accordance with claim 21 wherein said acid is an acid selected from the group consisting of sulfuric, hydrochloric, hydrofluoric, nitric and phosphoric acid.

26. The method in accordance with claim 21 including contacting said non-metallic product with a caustic solution prior to digesting in said acid solution.

27. The method in accordance with claim 21 wherein the non-metallic product comprises 40–75 wt. % alumina and 1–20 wt. % magnesia.

28. The method in accordance with claim 21 wherein the non-metallic product has an LOI at 1400° C. of 5–35 wt. %.

29. The method in accordance with claim 21 wherein said solid component is comprised of magnesium aluminate spinel.

* * * * *